United States Patent Office 3,117,965
Patented Jan. 14, 1964

3,117,965
SUBSTITUTED-1,4-BENZODIAZEPINE 2(1H)-ONE COMPOUNDS
Gabriel Saucy, Riehen, Switzerland, and Franklin Arteli Smith, Nutley, and Leo Henryk Sternbach, Upper Montclair, N.J., assignors to Hoffmann-La Roche Inc., Nutley, N.J., a corporation of New Jersey
No Drawing. Filed June 14, 1962, Ser. No. 202,401
Claims priority, application Switzerland Mar. 9, 1962
5 Claims. (Cl. 260—239.3)

This application relates to novel nitrogen heterocyclic compounds, their preparation, and novel intermediates therefor. Specifically the novel nitrogen heterocyclic compounds of this invention are 5-phenyl-3H-1,4-benzodiazepines substituted in the benzo and/or phenyl ring by a radical selected from the group consisting of carbamyl, carbo-lower alkoxy, cyano and carboxy. More specifically the novel nitrogen heterocyclic compounds of the invention are selected from the group consisting of compounds of the formula:

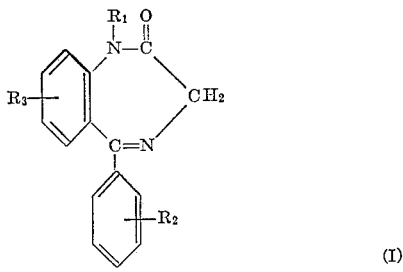

(I)

and their acid addition salts; wherein $R_2$ is selected from the group consisting of hydrogen and lower alkyl; $R_2$ and $R_3$ are each selected from the group consisting of carbamyl, carbo-lower alkoxy, cyano, carboxy, hydrogen and halogen; and at least one of $R_2$ and $R_3$ is selected from the group consisting of carbamyl, carbo-lower alkoxy, cyano and carboxy.

As used in this application the term "lower alkyl" refers to both straight and branched chain hydrocarbon radicals such as methyl, ethyl, propyl, isopropyl and the like. The term carbo-lower alkoxy refers to esterified carboxy radicals, for example carbomethoxy, carboethoxy and the like.

The nitrogen heterocyclic compounds of the invention conforming to Formula I above are basic in character and form acid addition salts with medicinally acceptable acids. The compounds of Formula I form medicinally acceptable acid addition salts with both organic and inorganic acids as for example nitric acid, sulfuric acid, hydrochloric acid, hydrobromic acid, p-toluene sulfonic acid, fumaric acid, succinic acid, maleic acid, formic acid, acetic acid, and the like.

The novel nitrogen heterocyclic compounds of this invention conforming to Formula I above have valuable medicinal properties and are useful as sedatives, tranquilizers, muscle relaxants and anticonvulsants. Especially preferred are the compounds of Formula I above wherein $R_3$ is cyano and is in the 7-position. They can be administered either in the base form or as an acid addition salt, with dosage adjusted to individual requirements, in conventional pharmaceutical forms such as tablets, capsules, suppositories, injectable solutions and the like. They can be taken internally, as for example orally or parenterally.

The novel heterocyclic nitrogen compounds of the inventions conforming to Formula I above can be prepared by several different routes. For example, compounds wherein $R_3$ is in the 7-position can be prepared from a 5-methyl-2-amino-benzophenone by a variety of methods. According to one method of the invention a 5-methyl-2-amino-benzophenone can be acylated to yield a 2-acetamino-5-methyl-benzophenone which can then in turn be oxidized to yield a 2-acetamino-5-carboxybenzophenone. This latter compound can then be hydrolyzed to a 2-amino-5-carboxybenzophenone which in turn can be esterified to yield a 2-amino-5-carbo-lower alkoxybenzophenone, which latter compound can be reacted with a haloacetyl halide, such as for example bromoacetyl bromide, to yield a 2-haloacetylamino-5-carbo-lower alkoxybenzophenone which in turn can be cyclized to yield a compound corresponding to Formula I above wherein $R_3$ is carbo-lower alkoxy. This latter compound can be reacted with ammonia to yield a compound according to Formula I above wherein $R_3$ is carbamyl. This latter carbamyl compound can be converted by dehydration to the corresponding cyano compound.

An alternative route comprises reacting a 2-aminobenzophenone with glycine or an ester thereof in order to directly effect cyclization to a compound conforming to Formula I above. The conversion carboxy to carbamyl to cyano can occur either all or in part on the aminobenzophenone intermediate or after the heterocyclic nucleus is formed.

Another alternative preparation route can be conducted by converting the 2-acetamino-5-carboxybenzophenone into the corresponding carbamyl compound and, in turn, dehydrating this to the corresponding cyano compound (i.e. a 2-acetamino-5-cyanobenzophenone) which can in turn then be hydrolyzed to a 2-amino-5-cyanobenzophenone which latter compound can be reacted with a haloacetyl halide to yield a 2-haloacetamino-5-cyanobenzophenone which can then be cyclized to a compound conforming to Formula I above wherein $R_3$ is cyano.

As can be appreciated from the above general description, the conversion of carboxy to carbamyl to cyano can be conducted before the heterocyclic nucleus conforming to Formula I above are formed on any of the various intermediate benzophenones. It can also be conducted after a compound conforming to Formula I above containing a carboxy substituent is formed. Furthermore, the conversion of carboxy to carbamyl can be conducted before the heterocyclic nucleus is formed with the conversion of carbamyl to cyano being conducted after the heterocyclic nucleus is formed. Also, as an alternative the carboxy can be esterified to a carbo-lower alkoxy compound which can then be converted to a carbamyl compound.

The invention herein also comprehends, in addition to the novel heterocyclic compounds conforming to Formula I above, certain novel intermediates therefor of the formula

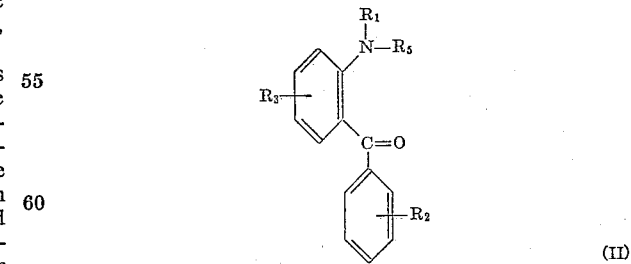

(II)

wherein $F_5$ is selected from the group consisting of hydrogen, acetyl and haloacetyl; $R_1$ is selected from the group consisting of hydrogen and lower alkyl; $R_2$ is selected from the group consisting of hydrogen and halogen; and $R_3$ is selected from the group consisting of carbamyl, carbo-lower alkoxy, cyano and carboxy.

Still another route of preparing the compounds conforming to Formula I above comprises converting a compound conforming to Formula II above wherein $R_5$ is haloacetyl into a corresponding 2-aminoacetaminobenzophenone, and then cyclizing the latter compound into a heterocyclic compound conforming to Formula I above. The 2-aminoacetaminobenzophenone compounds are not a part of this invention but their preparation is disclosed herein in order that the present disclosure may be complete.

The following examples are illustrative but not limitative of the invention. All temperatures are in degrees centigrade.

Example 1

Over a period of 30 minutes 71 g. of potassium permanganate was added in small portions to a stirred refluxing mixture of 50 g. of 2-acetamino-5-methylbenzophenone and 2.5 liters of water. The resulting mixture, containing starting material, the oxidation product and manganese dioxide was allowed to reflux for an additional two hours and was then filtered hot through a filter aid. The clear filtrate was acidified with approximately 100 ml. of 3 N hydrochloric acid and cooled in a refrigerator overnight. The precipitated product, 2-acetamino-5-carboxybenzophenone was filtered, washed with water and dried for 12 hours in vacuo at 50°. Upon crystallization from ethanol the product formed slightly yellow needles melting at 211°.

The 2-acetamino-5-methylbenzophenone used as a starting material in this example is not a part of this invention but its preparation is disclosed hereunder in order that the present disclosure may be complete.

A mixture consisting of 170 g. of 2-amino-5-methylbenzophenone, 300 ml. of acetic anhydride and 600 ml. of benzene was stirred and refluxed for 2 hours. The reaction mixture was cooled in an ice bath and the precipitate formed collected on a suction funnel and washed with ether, yielding 2-acetamino-5-methylbenzophenone, M.P. 154–155°.

Example 2

A mixture of 40 g. of 2-acetamino-5-carboxybenzophenone, 400 ml. absolute methanol and 8 g. p-toluene sulfonic acid was refluxed for 24 hours. While still hot, about ¼ of the solvent was evaporated, said evaporation resulting in the precipitation of the reaction product, 2-amino - 5 - carbomethoxybenzophenone. After cooling overnight at 0°, the precipitated product was filtered off, washed with cold ether and dried in vacuo at 60°. After crystallization from ethanol, the product formed prisms melting at 173–174°.

Example 3

During 30 minutes a solution of 7.8 ml. of bromoacetyl bromide in 20 ml. of dioxane was added in portions to a solution of 20.4 g. of 2-amino-5-carbomethoxybenzophenone in 200 ml. of dioxane, said solution being maintained at 20°. Afterwards, 20 ml. of 3 N sodium hydroxide was added within about 1 hour. The reaction mixture, after being permitted to stand overnight, was extracted with ether and the ether layer washed four times with water. After drying over sodium sulfate, the ether solution was concentrated to about 50 ml. Then 100 ml. of benzene was added and the resulting solution concentrated to about 100 ml. Said concentrated solution was then permitted to stand overnight at 0° and then filtered. The precipitate product was crystallized from acetone to yield light yellow needles of 2-bromoacetamino-5-carbomethoxybenzophenone melting at 151–152°.

Example 4

5 g. of 2-bromoacetamino-5-carbomethoxybenzophenone was reacted for 20 hours at room temperature with 100 ml. of a 40% solution of ammonia in methanol. The resulting crude reaction product was purified by chromatography on activated alumina (25-fold amount) containing 6% of water. After eluting with benzene and then with ether to remove unidentified contaminants, the product, 5 - phenyl-7-carbomethoxy-1,4-benzodiazepin-2-(1H)-one, was obtained by eluting with acetone. Upon crystallization from methanol the product formed prisms melting at 219–220°.

Example 5

4.275 g. of 5-phenyl-7-carbomethoxy-1,4-benzodiazepin-2(1H)-one was dissolved with warming in a mixture of 43 ml. of dioxane and 43 ml. of ethylene glycol. After cooling to 20°, 86 ml. of concentrated aqueous ammonia (58% ammonium hydroxide in water) was added and the resulting solution permitted to stand at room temperature for 8 days. The solution was then filtered and the so-obtained precipitate washed with methanol and ether and dried in vacuo to yield 7-carbamyl-5-phenyl-3H-1,4-benzodiazepin-2(1H)-one melting at 268–271° (dec.).

Example 6

42.5 g. of 2-acetamino-5-carboxybenzophenone was dissolved in 700 ml. of chloroform containing 15 g. of triethylamine. To this solution 16 g. of ethyl chlorocarbonate was added dropwise in the cold. The reaction mixture was stirred 3 hours, after which gaseous ammonia was introduced in the cold. The reaction mixture was then kept at room temperature for two days and then filtered. The filtrate was acidified and the chloroform layer evaporated to dryness. The residue obtained was washed with water and the water insoluble product so-obtained was recrystallized from alcohol to yield 2-acetamino-5-carbamylbenzophenone melting at 207–208.5°.

Example 7

34 g. of 2-acetamino-5-carbamylbenzophenone was dissolved in 250 ml. of ethylene dichloride and treated with 33 ml. of phosphorus oxychloride, the latter reagent being introduced dropwise at 65°. Heating at 65° was continued for 2 hours after which the reaction mixture was cooled and poured into 600 ml. of a mixture of ice and water. The organic layer was separated and washed with water until neutral, then dried over magnesium sulfate and concentrated in vacuo, yielding crude 2-acetamino-5-cyanobenzophenone which was filtered and washed with a mixture of one part benzene and four parts petroleum ether to yield a first crop of product. The filtrate was concentrated to dryness to yield a second crop of the reaction product.

Example 8

8.7 g. of 2-acetamino-5-cyanobenzophenone obtained as the second crop according to the procedure of Example 7 above was taken up in 100 ml. of methanol and treated, while the solution was still warm, with 50 ml. of 30% aqueous sodium hydroxide solution, whereupon a crystalline product separated almost immediately. After the reaction mixture had cooled down to room temperature (i.e. after about 2 to 3 hours standing) the product was filtered off, washed with water, dried and crystallized twice from alcohol to yield 2-amino-5-cyanobenzophenone melting at 165.5–166.1°.

Example 9

5 g. of 2-amino-5-cyanobenzophenone was dissolved in a mixture of 100 ml. of benzene and 100 ml. of ether. 2.7 g. of pyridine and 6.8 g. of bromoacetyl bromide were then added to the cold solution, and the resulting reaction mixture allowed to stand at room temperature overnight. An excess of hydrogen chloride in ether was added and a first crop of product filtered off and washed with water. The mother liquor, upon concentration afforded a second crop of product. Recrystallization from methylene chloride and alcohol yielded 2-bromo-acetamino-5-cyanobenzophenone melting at 144–145°.

Example 10

10.5 g. of 2-bromoacetamino-5-cyanobenzophenone dissolved in 35 cc. of dimethylformamide was poured into 525 cc. of liquid ammonia. The ammonia was allowed to evaporate and the residue treated with water and methylene chloride. The product was transferred from the methylene chloride solution to 10% hydrochloric acid which in turn was alkalized with sodium carbonate and the product extracted into toluene and methylene chloride. After drying the resulting solution, the methylene chloride was distilled off and the toluene solution was refluxed overnight using a Dean-Stark separator to remove the water formed in the ring closure. The product, 7-cyano-5-phenyl-3H-1,4-benzodiazepin 2(1H)-one, was obtained after adding petroleum ether to the toluene solution, and after crystallization from nitromethane melted at 253–255°.

*Example 11*

6.66 g. of 2-amino-5-cyanobenzophenone was treated in 70 cc. of pyridine and 1.5 g. of piperidine with 11.2 g. of glycine ethyl ether hydrochloride. The reaction mixture was refluxed for 16 hours after which the solvent was removed by distillation and the residue partitioned between ether and water. The ether extract after drying was concentrated for crops 1 and 2. Crop 2 was largely recovered starting material whereas crop 1 upon recrystallization from methylene chloride afforded the product 7-cyano-5-phenyl-3H-1,4-benzodiazepin-2(2H)-one hydrochloride. After several recrystallizations from alcohol it melted at 238° (dec.).

*Example 12*

3.5 g. of 7-cyano-5-phenyl-3H-1,4-benzodiazepin-2(1H)-one was dissolved in 47 cc. of methanolic sodium methoxide prepared from 0.33 g. of sodium. 4.7 cc. of methyliodide was added and the reaction mixture then stirred 3 hours at room temperature. The solvent was removed in vacuo and the residue treated with water. Recrystallization from benzene-ether followed by extraction with ether alone afforded 7-cyano-1-methyl-5-phenyl-3H-1,4-benzodiazepin-2(1H)-one melting at 158–160°.

*Example 13*

A suspension of 50 g. of 5-methyl-2-acetamino-2'-fluorobenzophenone in a solution of 50 g. of magnesium sulfate in 2.5 liters of water was heated to reflux. To this 100 g. of potassium permanganate was added with vigorous stirring over a period of 5 hours. Some foaming occurred and all the reagent was used up. After allowing the brown suspension to cool to about 70° it was filtered through a suction funnel. The last traces of magnesium dioxide were then removed by filtration without vacuum. Upon acidification of the clear filtrate with concentrated hydrochloric acid (Congo red) a voluminous precipitation of 5-carboxy-2-acetamino-2'-fluorobenzophenone occurred. This was collected on a funnel, thoroughly washed with water and dried in a vacuum oven at 70°. Crystallization from methanol yielded colorless needles melting at 251–252°.

The 5-methyl-2-acetamino-2'-fluorobenzophenone used as a starting material above is not a part of this invention but its preparation is herein set forth in order that this disclosure may be complete.

160 g. of o-fluorobenzoyl chloride was heated with stirring to 110°. To this was added, over a period of about 30 minutes, 47.2 g. of p-toluidine. The resulting mixture was slowly heated to 138° and then 100 g. of zinc chloride added thereto over a period of about 30 minutes. To complete the reaction the temperature was gradually raised within 1 hour to 225–230° and kept for 2 hours at this temperature. After the reaction mixture had cooled to 100°, 800 ml. of hot water was slowly added and the hot aqueous phase siphoned off. This extraction with hot water was repeated 3 times. The residual brown water insoluble solid was hydrolyzed by refluxing for 6 hours with a mixture of 70 ml. of water, 100 ml. of acetic acid and 130 ml. of concentrated sulfuric acid. The resulting reaction mixture was extracted with ether and petroleum ether. The organic layers were washed 4 times with water, 3 times with 3 N sodium hydroxide and again 3 times with water. After drying over sodium sulfate, the organic extracts were concentrated in vacuo to yield crude 5-methyl-2-amino-2'-fluorobenzophenone, which upon crystallization from benzene-hexane, melted at 68.5–69.5° (yellow needles).

68.3 g. of the crude 5-methyl-2-amino-2'-fluorobenzophenone prepared above and a mixture consisting of 130 ml. of anhydrous benzene, 130 ml. of acetic anhydride and 130 ml. of pyridine were heated on a steam bath for 2 hours, after which 200 ml. of methanol was added in order to destroy the excess of acetic anhydride. This caused the reaction mixture to boil for several minutes. After evaporation of ⅓ of the solvents, the resulting solution was kept overnight at 0°. The precipitate which separated was filtered off and washed with petroleum ether. After drying in vacuo, 5-methyl-2-acetamino-2'-fluorobenzophenone was obtained and, upon crystallization from benzene, formed almost colorless prisms melting at 162–163°.

*Example 14*

30.1 g. of 5-carboxy-2-acetamido-2'-fluorobenzophenone were dissolved in 400 ml. of chloroform containing 11 g. of triethylamine. To this a solution of 12 g. of ethyl chlorocarbonate in 50 ml. of chloroform was added with stirring over a period of 1 hour at 0–5°. The reaction mixture was then stirred for 3 hours at room temperature after which gaseous ammonia was introduced at 0–5°. The resultant mixture was stirred overnight at room temperature. A precipitate of 5-carbamyl-2-acetamino-2'-fluorobenzophenone formed, was collected on a funnel, washed with water and dried in vacuo at 60°. The filtrate was extracted with chloroform and washed in 3 portions with a total of 300 ml. of 1 N sodium hydroxide and then with water. The chloroform extract was then dried over sodium sulfate and evaporated to dryness, to yield an additional quantity of 5-carbamyl-2-acetamino-2'-fluorobenzophenone, which, after crystallization from ethanol formed colorless, hexagonal plates melting at 221–222°.

*Example 15*

A suspension consisting of 38.09 g. of 5-carbamyl-2-acetamino-2'-fluorobenzophenone, 380 ml. of ethylene dichloride and 38 ml. of phosphorus oxychloride was heated to reflux for 5 hours. The resulting solution was cooled and poured into 700 ml. of ice and water. The organic layer was separated and washed with water, 1 N sodium hydroxide and water, and then dried over sodium sulfate and concentrated in vacuo to dryness. The crude product was crystallized from methanol to give fine pale yellow needles of 5-cyano-2-acetamino-2'-fluorobenzophenone melting at 144–145°.

*Example 16*

A suspension of 33.3 g. of the crude 5-cyano-2-acetamino-2'-fluorobenzophenone prepared in Example 13 above in 333 ml. of methanol and 120 ml. of 3 N sodium hydroxide was stirred at room temperature for 2½ days. The product was filtered off, washed with water and crystallized from about 250 ml. of benzene to yield 5-cyano-2-amino-2'-fluorobenzophenone as fine yellow needles which after crystallization from benzene melted at 128–129°.

*Example 17*

12 g. of 5-cyano-2-amino-2'-fluorobenzophenone dissolved in 200 ml. of anhydrous ether containing 3.96 g. of pyridine was treated at 0° with 11.2 g. of bromoacetyl bromide in 50 ml. of anhydrous ether. The resulting suspension was stirred for ½ hour at 0° and for 3 hours at room temperature. Then, about 100 ml. of liquid ammonia was introduced into the reaction flask using a Dry Ice-acetone condenser. After stirring for 3 hours at reflux the Dry Ice condenser was replaced with a conventional condenser and the ammonia allowed to evaporate overnight. 100 ml. of water was then added and the reaction mixture stirred for 1 hour at room temperature. Insoluble material was then filtered off and washed with water and ether. After drying in vacuo, a brown solid material was obtained, which upon crystallization from a mixture of methylene chloride and benzene yielded a pink micro-crystalline material. The latter material was heated in an open tube to 170° for 30 minutes. After cooling, a brown solid was obtained which was crystallized 3 times from methanol using activated charcoal in order to decolorize the substance. This procedure yielded colorless needles of 7-cyano-5-(2-fluorophenyl)-3H-1,4-benzodiazepin-2(1H)-one melting at 239–240°.

*Example 18*

A suspension of 10 g. of 5-methyl-2-acetamino-2'-chlorobenzophenone in 500 ml. of water was heated to reflux. In small portions and with vigorous stirring 10 g. of potassium permanganate was added to the refluxing mixture. The mixture was kept at reflux temperature for 8 hours. The hot reaction mixture was then filtered through a diatomaceous earth filter aid and the filtrate acidified with 2N hydrochloric acid. The resulting white precipitate was filtered off, washed with water and dried in vacuo yielding 2-acetamino-5-carboxy-2'-chlorobenzophenone as a white powder which, after being crystallized 3 times from methylene chloride-ethanol, melted at 263–265°.

The 5-methyl-2-acetamino-2'-chlorobenzophenone used as a starting material above is not a part of this invention but its preparation is set forth herein in order that the present disclosure may be complete.

39 g. of o-chlorobenzoyl chloride was warmed to 110° and then, with stirring, 10.7 g. of p-toluidine was added and the mixture heated to 182°. 20 g. of anhydrous zinc chloride was then added and the temperature raised to 220°. The reaction mixture was kept at 220° for another hour. After cooling to 130°, 200 ml. of water was added and the mixture heated to reflux for 5 minutes with vigorous stirring. The hot water layer was decanted and the procedure repeated 3 times.

The water insoluble residue was then refluxed for 10 hours with a mixture of 25 ml. of water, 35 ml. of acetic acid and 50 ml. of concentrated sulfuric acid. The resulting dark solution was cooled, poured into ice water and the mixture extracted with ether. The ether solution was shaken with 2 N sodium hydroxide. Concentration of the dark ether solution yielded 5-methyl-2-amino-2'-chlorobenzophenone as a yellow oil which after being crystallized 3 times from hexane melted at 106–107°.

A mixture of 10 g. of 5-methyl-2-amino-2'-chlorobenzophenone, 10 ml. of acetic anhydride, 5 ml. of pyridine and 100 ml. of benzene was heated to reflux for 2 hours. The solvent was removed in vacuo and the residue was recrystallized twice from acetone-hexane yielding crystals of 5-methyl-2-acetamino-2'-chlorobenzophenone melting at 158°.

*Example 19*

A solution of 3.2 g. of 2-acetamino-5-carboxy-2'-chlorobenzophenone, 50 ml. of chloroform and 1 ml. of triethylamine was treated in the cold with 1.1 g. of ethyl chlorocarbonate. The reaction mixture was stirred for 2 hours after which a vigorous stream of gaseous ammonia was introduced for ¼ hour. The reaction mixture was kept at room temperature overnight and then more chloroform added to dissolve the precipitate. The chloroform solution was washed with 2 N hydrochloric acid, water, 2 N sodium hydroxide and again with water. It was then dried with sodium sulfate and concentrated to dryness. This yielded white crystals of 2-acetamino-5-carbamyl-2'-chlorobenzophenone which upon crystallization from ethanol forms prisms melting at 216–217°.

*Example 20*

6 ml. of phosphorus oxychloride was introduced into a solution of 5.9 g. of 2-acetamino-5-carbamyl-2'-chlorobenzophenone in 40 ml. of ethylene dichloride heated to 65°. After the addition had been completed, the solution was kept at 65° for another 1½ hours. Then it was poured on ice-water, the organic layer was washed neutral with sodium bicarbonate solution then dried with sodium sulfate. After evaporation of the solvent an almost white crystalline product was obtained which after two crystallizations from ethanol formed white needles of 2-acetamino-5-cyano-2'-chlorobenzophenone melting at 153–154°.

*Example 21*

4.3 g. of 2-acetamino-5-cyano-2'-chlorobenzophenone was dissolved in 70 ml. of hot (50°) methanol. To this hot solution 25 ml. of 30% aqueous sodium hydroxide was added. The mixture was kept at room temperature for 3 hours then diluted with water and extracted with methylene chloride. The methylene chloride solution was dried with sodium sulfate and evaporated. The residue was crystallized from benzene yielding yellowish prisms of 2-amino-5-cyano-2'-chlorobenzophenone melting at 151–152°.

*Example 22*

13 g. of bromoacetyl bromide was introduced at 25° into a suspension of 13 g. of 2-amino-5-cyano-2'-chlorobenzophenone and 250 ml. of absolute ether. After the addition had been completed the mixture was stirred at room temperature for 5 hours. The resulting yellowish precipitate was then filtered off, washed with water and dried in vacuo. The residue upon being twice recrystallized, yielded 2-bromoacetamino-5-cyano-2'-chlorobenzophenone melting at 158–159°.

*Example 23*

A solution of 4 g. of 2-amino-4'-cyano-2'-(2-chlorobenzoyl)-acetanilide in 40 ml. of pyridine was heated to reflux for 16 hours. The pyridine was removed in vacuo and the residue recrystallized from ethanol. There was obtained a first fraction of 1.5 g. of crystals melting at 277–279°. It was discarded. The second fraction upon being twice recrystallized from ethanol yielded 7-cyano-5-(2-chlorophenyl)-3H-1,4-benrodiazepin-2(1H)-one melting at 232–233°.

The 2-amino-4'-cyano-2'-(2-chlorobenzoyl)-acetanilide used above as a starting material is not a part of this invention but its preparation is disclosed herein in order that the present disclosure may be complete.

14 g. of 2-bromoacetamino-5-cyano-2'-chlorobenzophenone was added to 200 ml. of liquid ammonia. A yellow solution formed. The ammonia was permitted to evaporate overnight and the crystalline residue was treated with water and chloroform. The chloroform layer was extracted with 2 N hydrochloric acid and the acid extract was diluted with sodium hydroxide whereupon 2-amino-4'-cyano-2'-(2-chlorobenzoyl)-acetanilide separated as a white precipitate, which was filtered off, washed with water and dried in vacuo. After 2 crystallizations from ethanol-hexane the compound melted at 170–172°.

*Example 24*

A solution of 1.0 g. of 2-amino-2'-cyanobenzophenone in 85 ml. of anhydrous ether, cooled and stirred in an ice bath, was treated with a solution of bromoacetyl bromide (1.1 g.; 5.4 m. moles) in 10 ml. of ether. The reaction mixture was stirred for 45 minutes and then 30 ml. of water was added. Stirring was continued for 15 minutes and the mixture filtered. The precipitate was dissolved in 25 ml. of methylene chloride, washed with 30% (w./w.) sodium carbonate (20 ml.), water (2×20 ml.), dried and concentrated. The residue was recrystallized from an acetone hexane mixture to give 2-bromo-2'-(2-cyanobenzoyl)acetanilide as white needles, melting at 144–6°.

The above-mentioned 2-amino-2'-cyanobenzophenone, its process of preparation and intermediates therefor, are not a part of this invention but such are disclosed hereinbelow in order that the present disclosure may be complete.

A mixture of 176 g. of o-fluoro benzoyl chloride and 64 g. of p-chloroaniline was stirred and heated to 180°, at which temperature 87 g. of zinc chloride was introduced, the temperature raised to 200–205° and maintained there for forty minutes. The golden colored melt was quenched by the careful addition of 500 ml. of 3 N hydrochloric acid and the resulting mixture refluxed for five minutes. The acid solution was decanted and the process repeated three times to remove all o-fluorobenzoic acid. The grey granular residue was dissolved in 300 ml. of 75% (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of p-chloroaniline, three 500 ml. portions of 5 N sodium hydroxide solution to remove o-fluorobenzoic acid, and finally two 200 ml. portions of saturated brine solution. The methylene chloride extract was dried over anhydrous sodium sulphate and the solvent removed to give the crude aminobenzophenone. Recrystallization from methanol gave 2-amino-5-chloro-2'-fluorobenzophenone yellow needles (M.P. 94–95°).

50.0 g. of 2-amino-5-chloro-2'-fluorobenzophenone in 300 cc. of tetrahydrofuran was hydrogenated at atmospheric pressure in the presence of 10 g. of charcoal (Norite), 30.0 g. of potassium acetate and 2.5 cc. of a 20% palladous chloride solution (20% by weight of palladium). After an initiation period varying from ten minutes to an hour, hydrogen uptake was rapid and stopped completely after the absorption of the theoretical amount. Filtration of the catalyst over a "Hyflo" pad and removal of the solvent left a yellow crystalline residue. The crude mixture of ketone and potassium acetate was partitioned between methylene chloride (300 cc.) and water (1 l.). The layers were separated and the water layer washed with methylene chloride (3×50 cc.). The organic layers were combined, washed with 3 N sodium hydroxide solution (2×50 cc.), water (3×100 cc.), saturated brine solution (3×100 cc.), dried over anhydrous sodium sulfate and filtered. The solvent was removed and the product recrystallized from ethanol to give 2-amino-2'-fluorobenzophenone as yellow prisms melting at 126–8°.

A solution of 10.0 g. of 2-amino-2'-fluorobenzophenone in 20 ml. of concentrated sulfuric acid was added slowly to a cooled solution of 4.0 g. of sodium nitrite in 40 ml. of concentrated sulfuric acid, keeping the temperature below 10°. The reaction mixture was stirred at room temperature for one hour, cooled in an ice bath and carefully neutralized with a 30% (w./w.) solution of sodium carbonate. The resulting solution of diazonium salt was then added over a period of thirty minutes to a vigorously stirred, ice cold mixture of 100 ml. of benzene and a solution of 6 g. of sodium cyanide, 4.5 g. of copper cyanide and 2.5 g. of sodium bicarbonate in 40 ml. of water. The mixture was stirred at room temperature for one hour, then for five minutes at 50°, cooled and the layers separated. The aqueous layer was extracted with 100 ml. of benzene. The organic layers were combined, washed with 100 ml. of water, 50 ml. of saturated brine and evaporated to a brown oil. The oil was dissolved in ether and filtered through 25 g. of Grade I neutral alumina. The solution was concentrated and crystallized from an ether, petroleum ether (B.P. 30–60) mixture to give 2-cyano-2'-fluorobenzophenone, as pale yellow rods, melting at 73–4°.

A mixture of 7.6 g. of 2-cyano-2'-fluorobenzophenone, and 6.7 g. of benzylamine in 70 ml. of dry toluene was refluxed for two hours and then concentrated, under reduced pressure, to a bright green oil. The oil was dissolved in 100 ml. of methylene chloride, washed with water (3×75 ml.), dried over anhydrous sodium sulfate, filtered and concentrated. Crystallization from ether gave 2-benzylamino-2'-cyanobenzophenone, as yellow rods, melting at 142–143.5°.

A mixture of 6.0 g. of 2-benzylamino-2'-cyanobenzophenone and 1.0 g. of 10% palladium on charcoal and 1.4 ml. of concentrated hydrochloric acid in 150 ml. of glacial acetic acid was reduced with hydrogen. The reaction was stopped after forty minutes, when 1.15 moles of hydrogen had been adsorbed, filtered, neutralized with ammonium hydroxide at 10–15° and extracted with methylene chloride (3×100 ml.). The organic layers were combined, washed with 100 ml. of 30% (w./w.) sodium carbonate solution, 3×75 ml. of water, dried over anhydrous sodium sulfate, and evaporated. The residue was crystallized from an acetone, hexane mixture to give 2-amino-2'-cyanobenzophenone, as yellow plates melting at 132–3°.

A solution of 0.5 g. of the above-prepared 2-bromo-2'-(2-cyanobenzoyl)-acetanilide in 5 ml. of dichloromethane, was added to 15 ml. of liquid ammonia. The reaction mixture was stirred for five minutes and then the ammonia and solvent were removed under reduced pressure (no external heating). The residual oil was dissolved in 25 ml. of dichloromethane, and the resulting mixture filtered. Hexane was then added to the dichloromethane extract and the product was filtered off yielding 5-(2-carboxyphenyl)-3H-1,4-benzodiazepin-2(1H)-one as an amorphous white powder, softening at 185°, crystallizing at 190° and melting at 215–30°.

This application is a continuation in part of application Serial No. 114,038, filed June 1, 1961.

We claim:
1. A compound selected from the group consisting of compounds of the formula

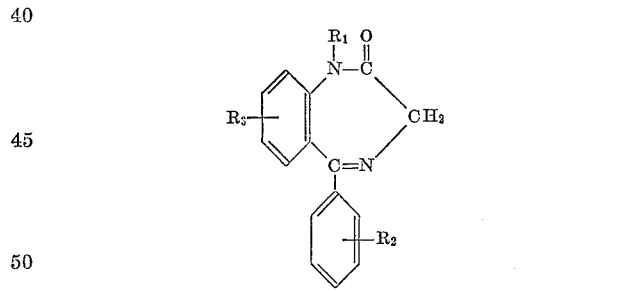

and their non-toxic acid addition salts; wherein $R_1$ is selected from the group consisting of hydrogen and lower alkyl; $R_2$ and $R_3$ are each selected from the group consisting of carbamyl, carbo-lower alkoxy, cyano, carboxy, hydrogen and halogen; and at least one of $R_2$ and $R_3$ is selected from the group consisting of carbamyl, carbo-lower alkoxy, cyano and carboxy.

2. 7-cyano-1-methyl-5-phenyl-3H-1,4-benzodiazepin-2(1H)-one.

3. 7-cyano-5-phenyl-3H-1,4-benzodiazepin-2(1H)-one.

4. 7-cyano-5-(2-halophenyl)-3H-1,4-benzodiazepin-2(1H)-one.

5. 7-cyano-1-lower alkyl-5-phenyl-3H-1,4-benzodiazepin-2(1H)-one.

References Cited in the file of this patent
UNITED STATES PATENTS

| | | |
|---|---|---|
| 2,880,208 | Yost | Mar. 31, 1959 |
| 2,889,327 | Howard et al. | June 2, 1959 |
| 2,893,992 | Sternbach | July 7, 1959 |
| 3,045,008 | Lombardino et al. | July 17, 1962 |

UNITED STATES PATENT OFFICE
CERTIFICATE OF CORRECTION

Patent No. 3,117,965                                                 January 14, 1964

Gabriel Saucy et al.

It is hereby certified that error appears in the above numbered patent requiring correction and that the said Letters Patent should read as corrected below.

Column 1, line 33, for "$R_2$" read -- $R_1$ --; column 2, line 64, for "$F_5$" read -- $R_5$ --; column 5, line 16, for "ether" read -- ester --; column 8, line 43, for "benrodiazepin" read -- benzodiazepin --; column 10, line 12, for "1.15 moles" read -- 1.15 m. moles --.

Signed and sealed this 16th day of June 1964.

(SEAL)
Attest:

ERNEST W. SWIDER                                                     EDWARD J. BRENNER
Attesting Officer                                                              Commissioner of Patents